United States Patent
Zhao et al.

(10) Patent No.: US 9,543,566 B2
(45) Date of Patent: Jan. 10, 2017

(54) ELECTRODE WITH FEEDTHROUGH PIN FOR MINIATURE ELECTROCHEMICAL CELLS AND METHODS OF MAKING

(71) Applicant: Medtronic, Inc., Minneapolis, MN (US)

(72) Inventors: Hailiang Zhao, Maple Grove, MN (US); Christian S. Nielsen, River Falls, WI (US)

(73) Assignee: Medtronic, Inc., Minneapolis, MN (US)

(*) Notice: Subject to any disclaimer, the term of this patent is extended or adjusted under 35 U.S.C. 154(b) by 374 days.

(21) Appl. No.: 14/153,125

(22) Filed: Jan. 13, 2014

(65) Prior Publication Data

US 2014/0123476 A1 May 8, 2014

Related U.S. Application Data

(62) Division of application No. 12/915,411, filed on Oct. 29, 2010, now abandoned.

(51) Int. Cl.

| | |
|---|---|
| H01M 4/04 | (2006.01) |
| H01M 2/06 | (2006.01) |
| H01M 2/30 | (2006.01) |
| H01M 4/139 | (2010.01) |
| H01M 4/54 | (2006.01) |
| H01M 4/70 | (2006.01) |
| H01M 10/04 | (2006.01) |
| H01M 10/05 | (2010.01) |

(52) U.S. Cl.
CPC ............. *H01M 4/043* (2013.01); *H01M 2/065* (2013.01); *H01M 2/30* (2013.01); *H01M 4/139* (2013.01); *H01M 4/54* (2013.01); *H01M 4/70* (2013.01); *H01M 10/0422* (2013.01); *H01M 10/05* (2013.01); *Y02E 60/122* (2013.01); *Y10T 29/49108* (2015.01)

(58) Field of Classification Search
CPC .............................. H01M 4/043; H01M 4/139
See application file for complete search history.

(56) References Cited

U.S. PATENT DOCUMENTS

| | | | |
|---|---|---|---|
| 3,440,110 A * | 4/1969 | Erhard | ................ H01M 2/0222 429/144 |
| 4,263,378 A | 4/1981 | Feiman et al. | |
| 4,333,997 A | 6/1982 | Athern | |
| 5,306,581 A | 4/1994 | Taylor et al. | |

(Continued)

FOREIGN PATENT DOCUMENTS

| | | |
|---|---|---|
| EP | 1760807 A1 | 3/2007 |
| WO | 9441608 A1 | 11/1997 |

OTHER PUBLICATIONS

P0038293.WOU2 (PCT/US2011/055040) PCT Notification of Transmittal of the International Search Report and the Written Opinion of the International Searching Authority, Mailed Dec. 29, 2011, 12 pages.

*Primary Examiner* — Rena L Dye (57) ABSTRACT

Miniature electrodes and electrochemical cells are disclosed. Such electrodes are made from forming an electrode mixture onto a current collector and distal end of a feedthrough pin such that the current collector and distal end of the feedthrough pin is encapsulated. The methods and electrode assemblies disclosed herein allow such electrode assemblies to be made free from the step of directly attaching a formed electrode to a feedthrough pin and thus simplifying assembly and decreasing size.

15 Claims, 8 Drawing Sheets

(56) References Cited

U.S. PATENT DOCUMENTS

| | | | |
|---|---|---|---|
| 5,658,688 A | 8/1997 | Jolson | |
| 5,716,729 A | 2/1998 | Sunderland et al. | |
| 6,197,445 B1 * | 3/2001 | Ward | H01M 2/0452 |
| | | | 429/163 |
| 6,482,543 B1 | 11/2002 | Shelekhin et al. | |
| 6,670,074 B2 | 12/2003 | Spillman | |
| 7,035,078 B1 | 4/2006 | Viavattine | |
| 7,684,171 B2 | 3/2010 | Rorvick et al. | |
| 7,740,980 B2 | 6/2010 | Gray et al. | |
| 7,758,782 B2 * | 7/2010 | Fehrmann | H01M 4/043 |
| | | | 264/104 |
| 8,451,131 B2 | 5/2013 | Ghazarian | |
| 8,945,753 B2 * | 2/2015 | Chen | H01M 2/1653 |
| | | | 428/315.9 |
| 2005/0252603 A1 * | 11/2005 | Rule | B29C 33/02 |
| | | | 156/245 |
| 2007/0117021 A1 | 5/2007 | Frustaci et al. | |
| 2009/0239141 A1 * | 9/2009 | Freitag | H01M 2/0426 |
| | | | 429/175 |
| 2010/0304209 A1 | 12/2010 | Lund et al. | |
| 2010/0305627 A1 | 12/2010 | Anderson | |
| 2010/0305629 A1 | 12/2010 | Lund et al. | |
| 2011/0104542 A1 * | 5/2011 | Gan | H01M 4/06 |
| | | | 429/96 |
| 2013/0196231 A1 * | 8/2013 | Nielsen | H01M 4/043 |
| | | | 429/219 |
| 2014/0342225 A1 * | 11/2014 | Isshiki | H01M 4/139 |
| | | | 429/217 |

* cited by examiner

ELECTRODE WITH FEEDTHROUGH PIN FOR MINIATURE ELECTROCHEMICAL CELLS AND METHODS OF MAKING

RELATED APPLICATIONS

This application is a divisional of U.S. application Ser. No. 12/915,411 filed Oct. 29, 2010, now abandoned.

FIELD

The invention is related to electrodes for electrochemical cells and methods of making such electrodes and electrochemical cells.

BACKGROUND

The following discussion discloses electrodes and electrochemical cells and methods of making such electrodes and cells for use in an implantable medical device (IMD) that is very compact, such that IMD can be readily implanted in small spaces within the patient's anatomy, and such that the IMD is less likely to cause patient discomfort. Additionally, manufacturing of the electrodes and electrochemical cells for such IMDs can be facilitated due to several features, which will be described in greater detail below.

SUMMARY

Electrode assemblies and methods of making such electrode assemblies are disclosed. In one embodiment, an electrode assembly comprises a current collector attached to a distal portion of a feedthrough pin, and an electrode that includes electrode material encapsulating the attached current collector and the distal portion of the feedthrough pin.

In another embodiment, a method of making an electrode assembly includes attaching a current collector to a distal portion of a feedthrough pin and forming a solid electrode electrically coupled to the current collector and the feedthrough pin, the solid electrode encapsulating the current collector and the distal portion of the feedthrough pin.

In another embodiment, an electrochemical cell includes a housing, an electrode assembly partially within the housing, the electrode assembly comprising a current collector attached to a distal portion of a feedthrough pin and a first electrode comprising a first electrode material encapsulating the attached current collector and the distal portion of the feedthrough pin, a proximate portion of the feedthrough pin extending from the housing, and a second electrode within the housing and electrically coupled to the housing, the first electrode electrically insulated from the housing and the second electrode.

In another embodiment, method includes assembling an electrode assembly comprising the steps of attaching a current collector to a distal portion of a feedthrough pin and forming a solid first electrode electrically coupled to the current collector and feedthrough pin from a first electrode material coupled to the feedthrough pin and the attached current collector and encapsulating the current collector, and inserting the electrode assembly into a housing, the housing containing a second electrode electrically coupled to the housing and the housing configured to electrically insulate the first electrode from the housing and the second electrode.

DETAILED DESCRIPTION

As used herein, "encapsulating" also includes substantially encapsulating wherein an outline of the top of the current collector is visible or a fraction of the top of the current collector protrudes from the formed electrode;

"Anode" and "cathode" are used as these terms are commonly understood in reference to electrochemical cells, for example, batteries and capacitors.

Figure 1:
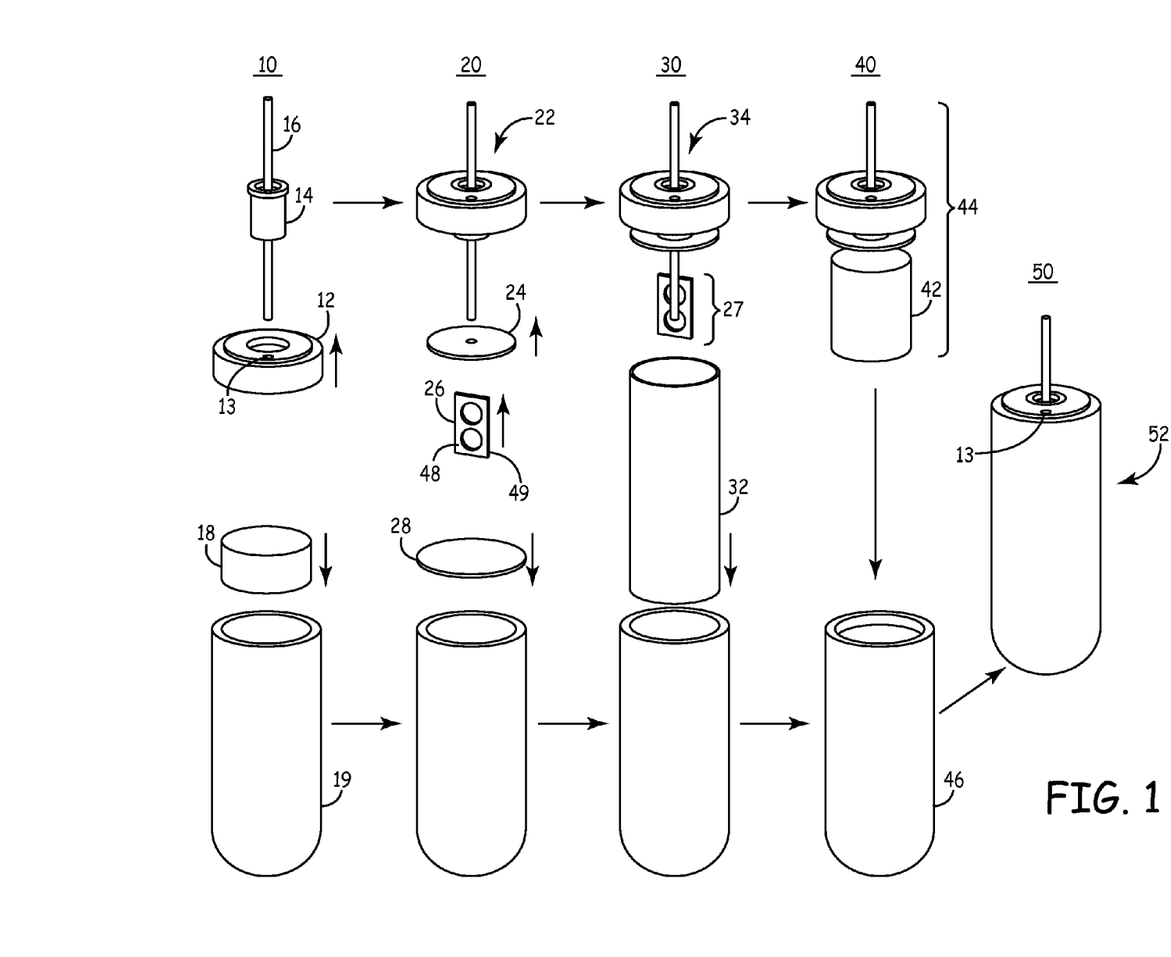
FIG. 1 depicts an embodiment of an assembly method for an electrochemical cell and an embodiment of an electrode assemble and electrochemical cell of the disclosure.

The methods and electrode assemblies of the invention can be used to assemble electrochemical cells, for example batteries and capacitors. Such batteries and capacitors are useful in compact IMDs that can be implanted within small spaces of an anatomy, such as the vasculature or an organ, for example, a chamber of the heart. One embodiment of an electrochemical cell and a method of assembling such cell are shown in FIG. 1. In this embodiment, assembly step 10 includes attaching a feedthrough 14 to the feedthrough pin 16, attaching a cover 12 onto the feedthrough 14 by welding, for example, laser beam welding which is hermetically attached to a feedthrough pin 16 to form a feedthrough assembly 22. A solid, cylindrical or "puck-shaped" anode 18 is placed into an outer case 19. As shown in FIG. 1, the feedthrough pin is a solid, unitary pin that extends continuously from its distal tip, extending through the solid electrode, through the feedthrough 14 and extending outward from the feedthrough.

Assembly step 20 includes sliding an insulator disk 24 over the feedthrough pin 16 and adjacent to the feedthrough 14 and a conductive current collector 26 is attached to the distal end of the feedthrough pin 27, for example, by welding, to form a header assembly 34. A disk shaped separator 28 is placed into the outer case 19 and adjacent the anode 18.

A cylindrical and tubular cathode insulator 32 is placed within the outer case 19 for isolation of a cathode from the wall of the outer case 19 in assembly step 30. As shown in assembly step 40, a solid and cylindrically shaped cathode 42 is formed onto and encapsulates the attached current collector 26 and a distal portion of the feedthrough pin, including the attachment points, for example, welds, where the current collector is attached to the feedthrough pin. Details on how the cathode is formed onto the current collector and feedthrough pin are provided below.

The resulting cathode assembly 44 can be mated with the anode assembly 46 and an electrolyte can be introduced through the fill port 13 to provide an electrochemical cell 52 at assembly step 50. Such assembly methods provide a complete electrode or cathode assembly 44 which does not require separate attachment of an electrode to a feedthrough pin, for example, between the cap 12 and the electrode 42 or otherwise, within the electrochemical cell. In other words, the feedthrough pin is unitary or a single piece (other than an attached current collector) from the distal end of the electrode through the cap and extending outward. The cover can be attached to the outer case, for example, welded to the case via a continuous weld along the contact areas.

Figure 3:
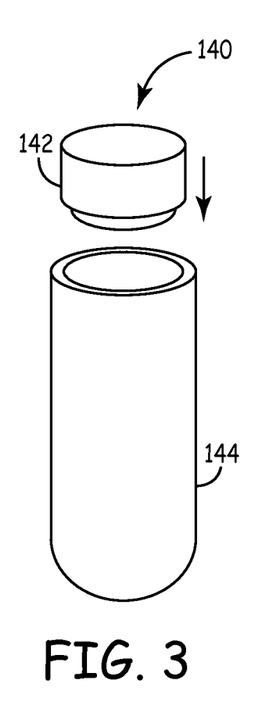
FIG. 3 depicts an embodiment of a solid electrode useful in the electrochemical cells of the disclosure.

Of course, the shapes of the anode, cathode, and outer case can vary depending upon the application. For example, the cross section of the anode and cathode can be circular, elliptical, ovate, and other geometrical shapes and can be adapted based on the shape of the outer case. For example, FIG. 3 shows a generally cylindrical anode 140 having a tapered or beveled distal end 142 for conforming to the interior distal end or bottom of the outer case 144. Additionally, the shape of the current collector can be varied. Typically, the current collector is rectangular and planar and can have varying lengths. The current collect can be other shapes including a simple pin shape, a looped wire, a plastically deformed wire, a wire mesh, or any other shape that improves adhesion and electrical connectivity to the feedthrough pin.

Figure 2:
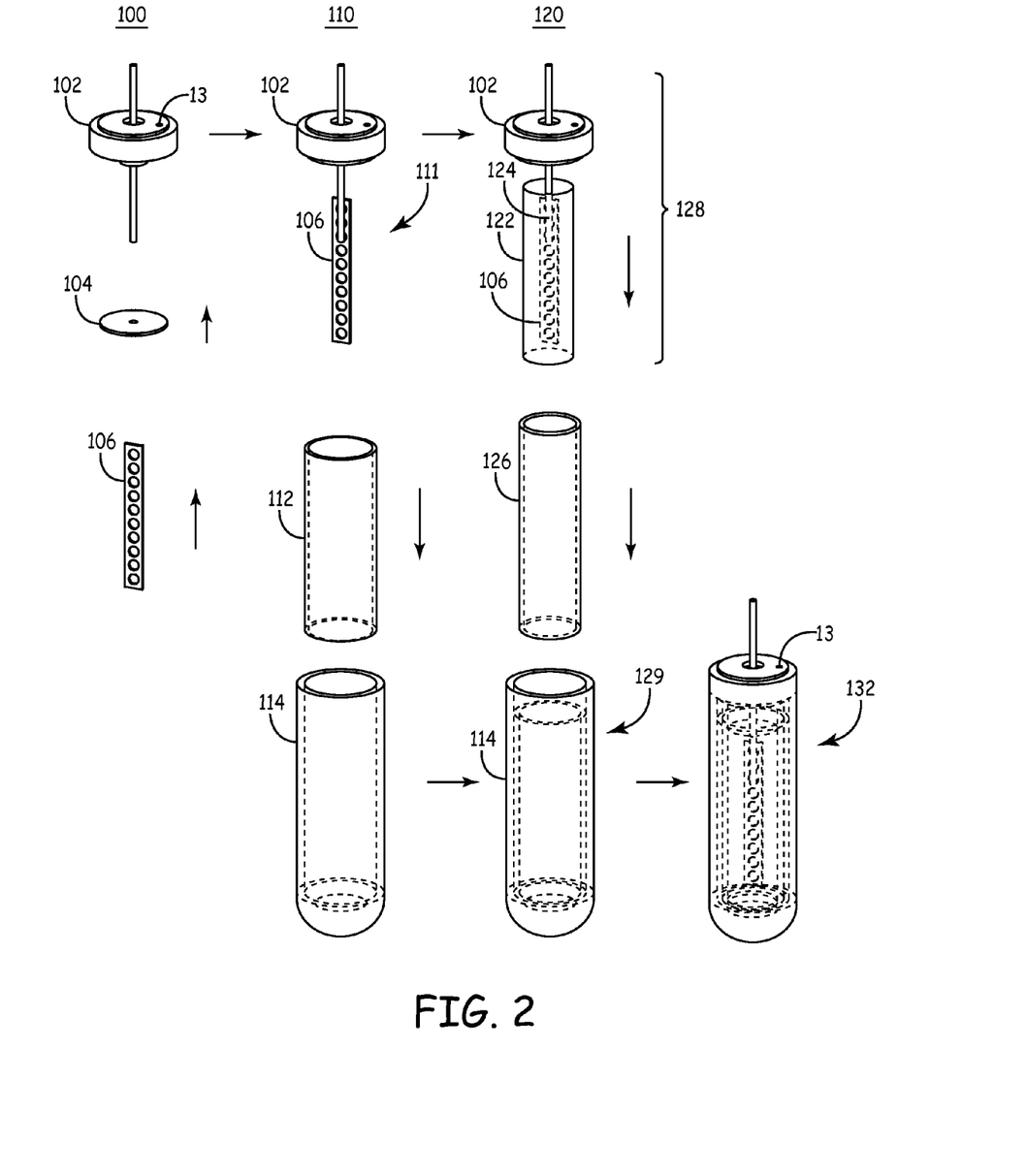
FIG. 2 depicts another embodiment of an assembly method for an electrochemical cell and another embodiment of an electrode assemble and electrochemical cell of the disclosure.

Another embodiment of an electrochemical cell and a method of assembling such cell are shown in FIG. 2. In assembly step 100, a feedthrough assembly 102 is provided and an insulator disk 102 and current collector 106 are assembled and attached as described above to from a header assembly 111. In assembly step 110, a cylindrical and tubular anode 112 is placed within an outer case 114. A cathode 122 is formed onto and encapsulates the current collector 106 and a distal portion of the feedthrough pin 124. Details on how the cathode is formed onto the current collector and feedthrough pin are provided below. A tubular separator 126 is concentrically placed within the tubular anode 112 and within the outer case 114. The cathode assembly 128 is mated with the anode assembly 129 and an electrolyte can be introduced through the fill port 13 to provide an electrochemical cell 132.

Materials used in the electrochemical cells described in this application are those materials that are suitable for use in such cells. For instance, feedthrough pins are typically made from metals such as platinum, niobium, molybdenum, titanium alloys (such as Ti6Al4V ELI, Ti3Al2.5V), and stainless steels and alloys or any of them; covers and outer cases are typically made from metals such as titanium, aluminum, and stainless steels; feedthroughs are typically made from metals such as titanium, stainless steel, and alloys of either and contain sealing materials including glass, such as CABAL 12, and LaBor-4; separators are typically made from materials comprising porous polypropylene films, such as commercially available CELGARD 2500 and CELGARD 4560 films from Celgard LLC, Charlotte, N.C.; insulator disks and cathode insulators are typically made of polymeric materials such as polypropylene and ethylene tetrafluoroethylene (ETFE); current collectors are typically comprised of an electrically conductive material such as titanium, aluminum, vanadium, nickel or alloys and mixtures or any of them; anodes for batteries are typically lithium metal, and anodes for capacitors are typically aluminum, tantalum, niobium, and alloys of any of these; electrode materials for cathodes comprise mixtures of silver vanadium oxide (SVO) powder and carbon mono fluoride (CFx) powder and may further comprise carbon black or polytetrafluoroethylene (PTFE), or a combination of both; useful electrolytes include those electrodes that comprise LIBF4 or LiAsF6, for example, containing a mixture of LiBF4, gamma-butyrolactone (GBL) and dimethoxyethane (DME), or a mixture of LiAsF6, propylene carbonate (PC), and DME.

An exemplary method of making an electrode described in this disclosure, for example, a cathode will be described in greater detail. Generally, in one embodiment, a header assembly, for example 111, is placed within a device such that the current collector and distal portion of the feed through pin is within a mold or press die. Electrode material is added to the mold and the electrode material is compressed or pressed onto the current collector and conforming to the walls of the mold or press die and press punches.

Figure 4:
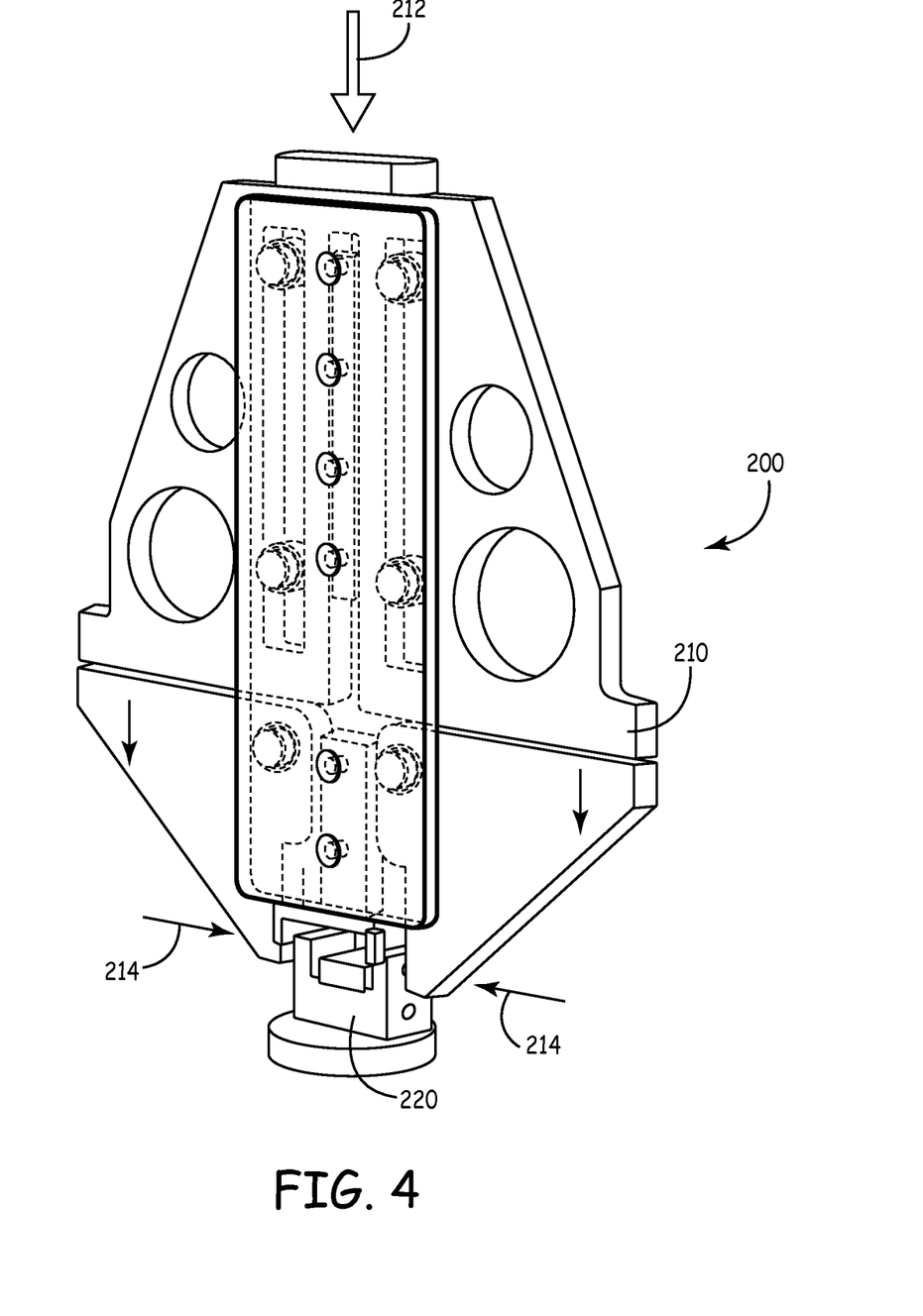
FIG. 4 depicts an embodiment of a press assembly useful for making electrode assemblies of the disclosure.
Figure 5:
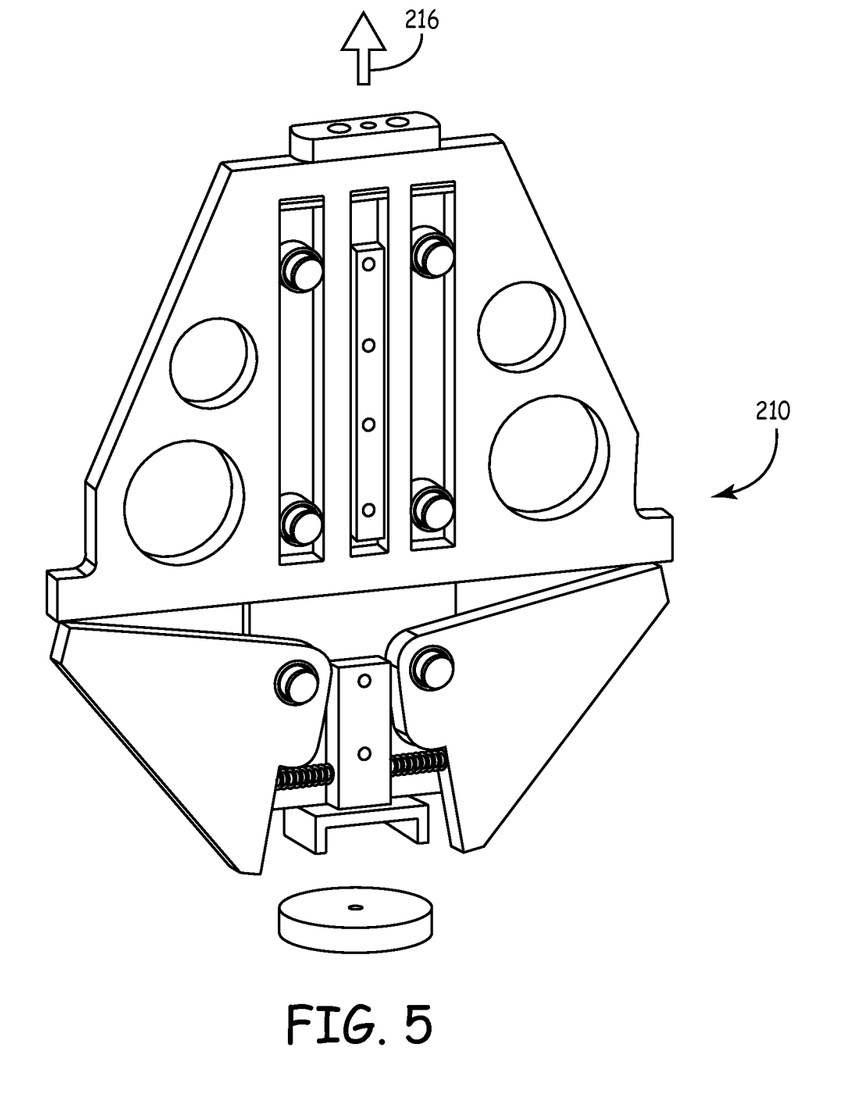
FIG. 5 depicts a press frame in an open position.

FIG. 4 shows a press apparatus 200 useful for in methods of forming electrode assemblies of the disclosure. Press apparatus 200 includes a press frame 210 and a press assembly 220. The press frame 210 is used to convert downward force illustrated by arrow 212 to synchronized opposing press motion or forces, illustrated by arrows 214 onto the press assembly 220. The opposing press forces 214 also hold the press assembly rigidly in place. FIG. 5 shows press frame in the open position after the application of an upward force illustrated by arrow 216. Downward force 212 may be applied by methods and devices known to those skilled in the art, for example, a hydraulic or servo press. The press frame is typically made from metal, for example steel.

Figure 6:
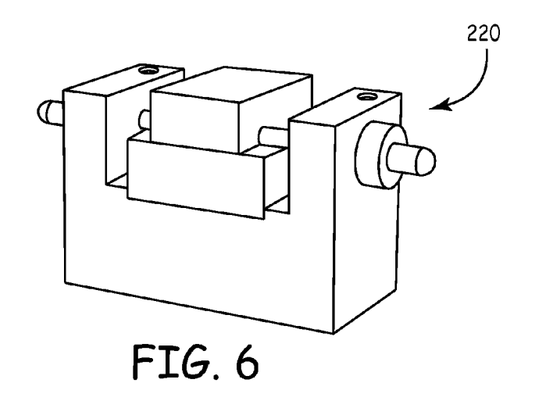
FIG. 6 depicts a press assembly useful in making electrode assemblies of the disclosure.
Figure 7:
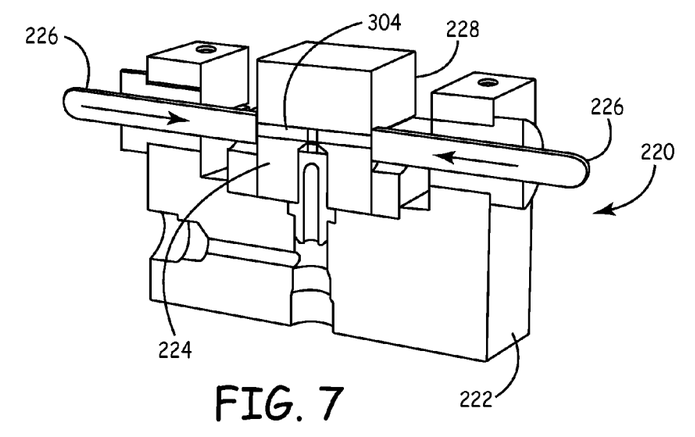
FIG. 7 depicts a cross-sectional view of a press assembly.

FIG. 6 is a magnified depiction of press assembly 220 and FIG. 7 is a cross-sectional view of the press assembly shown in FIG. 6. Major components of press assembly 220 include a die frame, die assembly 224 and force transfer posts 226. The force transfer posts 226 transfer the horizontal force 214 from the press frame 210 to the opposed press punches 304 in the die assembly.

Figure 8:
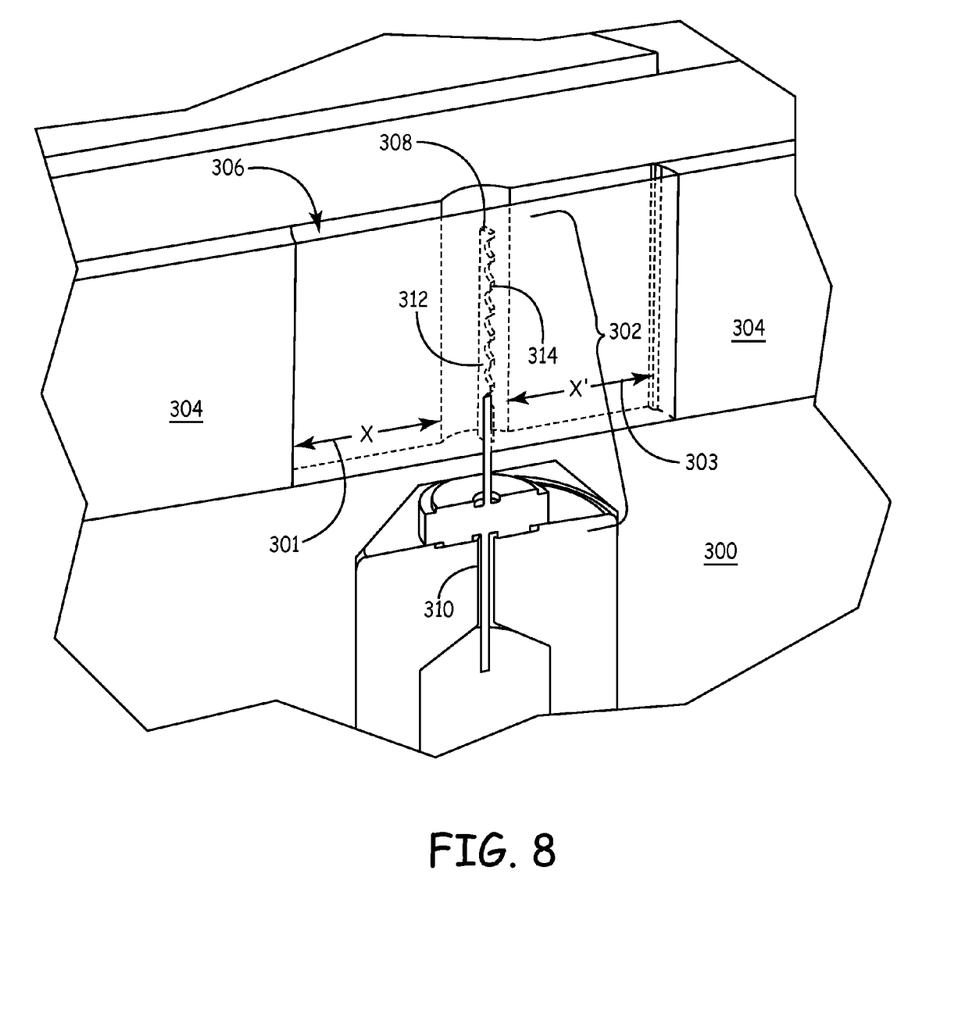
FIG. 8 depicts an enlarged cross-sectional view of a portion of a press assembly prior to formation of an electrode.

FIG. 8 shows a cross-section of a portion of a die assembly 300 and a cross section of a header assembly 302 between open opposed press punches 304 with electrode material within the space defined by the open press punches. The electrode material 306 fills the volume of the space defined by the open press punches and surrounds or encompasses the current collector 308 and distal portion of the feedthrough pin 310 and including the attachment points, for example, welds where the current collector is attached to the feedthrough pin. The attached current collector 308 is oriented such that the bidirectional pressing forces are applied to the major surfaces 312 of the current collector as opposed to the minor surfaces 314. The die assembly 300 is designed and provided so that the current collector and distal end of the feedthrough pin is substantially centered with the space between the open press punches and the distal end of the current collector is within such space. After being formed, the volume of the electrode material is decreased by a factor of 4×, in other embodiments, 5×, or 3×. Of course, the volume of any compressed electrode material depends upon the particular composition, its morphology, particle size, and the like.

Figure 9:
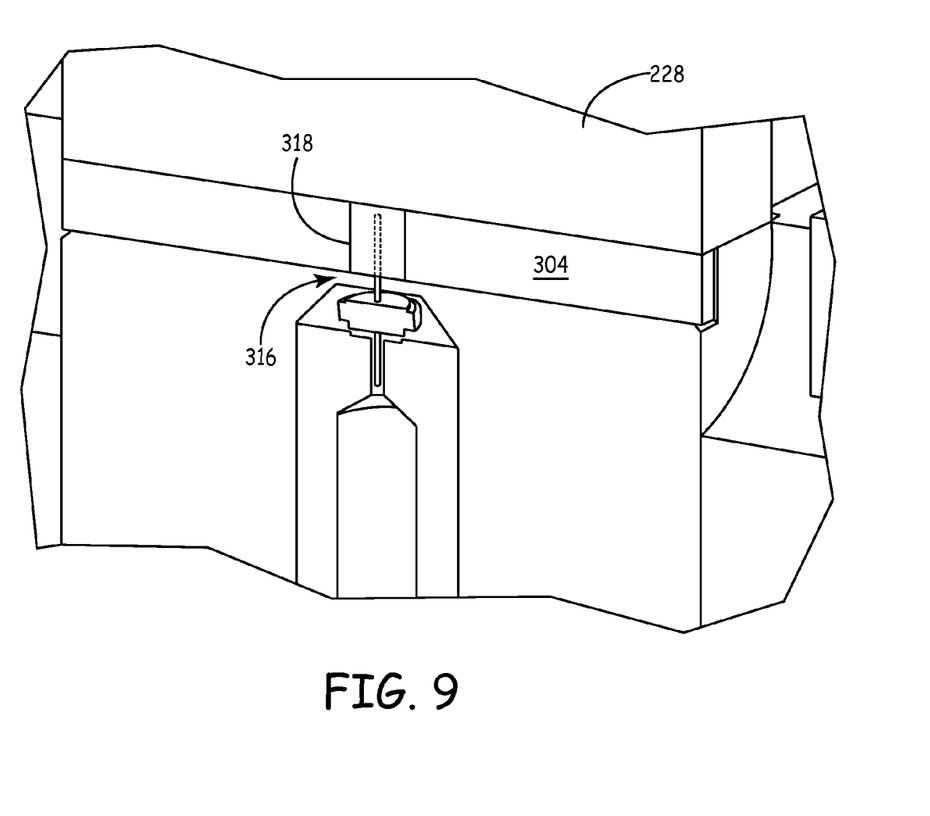
FIG. 9 depicts another cross sectional view of a press assembly containing an electrode assembly post forming.

FIG. 9 shows an embodiment of an electrode assembly 316 after electrode material has been compacted or pressed or compressed between the press punches 304 to form a solid electrode that encapsulates the current collector 318. The terms "encapsulates and "encapsulating" includes substantially encapsulates and substantially encapsulating wherein an outline of the top of the current collector is visible or a fraction of the top of the current collector protrudes from the formed electrode.

Typically, the electrode material is compacted, pressed or compressed within the die assembly through synchronized bidirectional pressing forces, that is, opposed forces generated from substantially simultaneous movement of each press punch toward the current collector such that each press punch moves or travels substantially the same distance, but in an opposed direction such that distance "X" 301 substantially equals distance "X" 303 (FIG. 8). The electrode material is pressed or compressed until the desired density and geometry of the solid electrode is reached. Typical applied force ranges from about 200 to 500 N, including all points and ranges in between. Once the electrode is made, it is removed from the press assembly and then the entire assembly can easily be inserted and joined to an outer case to complete an electrochemical cell without the step of attaching or welding an electrode to a feedthrough pin.

The methods, electrode assemblies and electrochemical cells described in this disclosure are useful in implantable medical device described in, for example, U.S. application Ser. Nos. 12/547,903, 12/548,234; 12/549,469; 12/549,572 filed on May 29, 2009; and incorporated by reference in this application for the description of the implantable medical devices.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that exemplary embodiments may be embodied in many different forms and that neither should be construed to limit the scope of the disclosure. In some exemplary embodiments, well-known processes, well-known device structures, and well-known technologies are not described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures.

The invention claimed is:

1. A method of making an electrode assembly for an electrochemical cell comprising the steps of:
   providing a feedthrough assembly comprising a cover having an outside surface and an inside surface, a feedthrough attached to and extending through the cover and a unitary feedthrough pin extending through and hermetically sealed within the feedthrough;
   attaching a current collector to a distal portion of the feedthrough pin at an attachment point; and
   forming a solid electrode electrically coupled to the current collector and the feedthrough pin by compressing an electrode material with synchronized bidirectional pressing forces, the solid electrode encapsulating the current collector and the distal portion of the feedthrough pin and including the attachment point, the unitary feedthrough pin extending from a distal end within the solid electrode to a proximate end opposite the first end and extending outward from the outside surface of the cover.

2. The method of claim 1 wherein the synchronized bidirectional pressing forces include opposed press punches each moving substantially the same distance in an opposed direction.

3. The method of claim 1 wherein the step of attaching a current collector to a feedthrough pin includes welding the current collector to the feedthrough pin.

4. The method of claim 1 further comprising the steps of attaching a feedthrough to the feedthrough pin distal from the current collector, fitting a housing cover onto the feedthrough and fitting a feedthrough insulator adjacent to the housing cover and the feedthrough.

5. The method of claim 1 wherein the electrode material comprises a mixture of silver vanadium oxide and carbon mono-fluoride.

6. The method of claim 1 wherein the synchronized bidirectional pressing forces include an applied force in a range of about 200 to about 500 N.

7. The method of claim 1 wherein the current collector has a planar shape.

8. The method of claim 1 wherein the bidirectional pressing forces are perpendicular to an axis of the feedthrough pin.

9. The method of claim 7 wherein the current collector has a planar shape having major and minor surfaces and the planar current collector is oriented such that the bidirectional pressing forces are applied to the major surfaces of the planar current collector.

10. The method of claim 1 wherein the step of compressing the electrode material includes compressing the electrode material within a mold.

11. A method comprising the steps of:
assembling an electrode assembly comprising the steps of
providing a feedthrough assembly comprising a cover having an outside surface and an inside surface, a feedthrough attached to and extending through the cover and a unitary feedthrough pin extending through and hermetically sealed within the feedthrough;
attaching a current collector to a distal portion of the feedthrough pin at an attachment point and forming a solid first electrode electrically coupled to the current collector and feedthrough pin from a first electrode material by compressing the electrode material with synchronized bidirectional pressing forces, the solid first electrode coupled to the feedthrough pin and the attached current collector and encapsulating the current collector and including the attachment point, the unitary feedthrough pin extending from a distal end within the solid electrode to a proximate end opposite the first end and extending outward from the outside surface of the cover; and
inserting the electrode assembly into a housing, the housing containing a second electrode electrically coupled to the housing and the housing configured to electrically insulate the first electrode from the housing and the second electrode.

12. The method of claim 11 wherein the synchronized bidirectional pressing forces include opposed press punches each moving substantially the same distance in an opposed direction.

13. The method of claim 11 wherein the current collector has a planar shape.

14. The method of claim 11 wherein the current collector has a planar shape having major and minor surfaces and the planar current collector is oriented such that the bidirectional pressing forces are applied to the major surfaces of the planar current collector.

15. The method of claim 11 wherein the synchronized bidirectional pressing forces include an applied force in a range of about 200 to about 500 N.

* * * * *